United States Patent

Deynet et al.

Patent Number: 5,410,921
Date of Patent: May 2, 1995

[54] UNIVERSAL WINDOW-ACTUATOR DRIVE UNIT

[75] Inventors: Rolf Deynet, Würzburg; Wolfram Knappe, Kitzingen; Peter Michel, Kleinrinderfeld, all of Germany

[73] Assignee: Siemens Aktiengesellschaft, Germany

[21] Appl. No.: 97,344

[22] Filed: Jul. 23, 1993

[30] Foreign Application Priority Data

Jul. 23, 1992 [DE] Germany .................. 9209929 U

[51] Int. Cl.⁶ .............................................. F16H 1/16
[52] U.S. Cl. ..................................... 74/89.14; 74/425; 49/337; 49/341
[58] Field of Search .................. 74/89.14, 425; 49/341, 49/337

[56] References Cited

U.S. PATENT DOCUMENTS

| | | |
|---|---|---|
| 2,651,212 | 9/1953 | Mackmann ........................ 74/425 |
| 3,398,590 | 8/1968 | Campbell et al. ................. 74/89.14 |
| 3,722,311 | 3/1973 | Northrup .......................... 74/425 |
| 4,643,040 | 2/1987 | Adam et al. ...................... 74/425 |
| 5,095,766 | 3/1992 | Knappe et al. ................... 74/89.22 |

FOREIGN PATENT DOCUMENTS

0360912 4/1992 Germany .

Primary Examiner—Allan D. Herrmann
Attorney, Agent, or Firm—Kenyon & Kenyon

[57] ABSTRACT

A universal window-actuator drive unit capable of use with either a cable pulley window-actuator or an arm-scissors type window-actuator. A worm shaft extends from a driving motor and is rotatably coupled to a worm gear. The worm gear is coupled in a rotational-slave relationship to a driving disk, and both the worm gear and the driving disk are rotatably supported on a gear housing shaft. At its end opposite the driving disk, the gear housing shaft includes an actuator shaft collar concentrically surrounding the gear housing shaft and having a grooved toothing about its inner circumference. This inner grooved toothing enables the window-actuator drive unit to be coupled to either a drive pinion of an arm-scissor type window actuator or a cable pulley of a cable pulley window actuator, each of which include couplings having an outer grooved toothing corresponding to the inner grooved toothing of the actuator shaft collar.

8 Claims, 3 Drawing Sheets

UNIVERSAL WINDOW-ACTUATOR DRIVE UNIT

BACKGROUND OF THE INVENTION

The present invention relates to the field of automotive window-actuators in general, and in particular to an improved universal window-actuator drive unit.

A window-actuator drive unit is a device that, when coupled to a window-actuator, provides up-down movement to open and close a window. Such a device is typically used to provide "power windows" in an automobile. A window-actuator to which a window-actuator drive unit may be connected is generally one of two types: cable pulley, and arm-scissor type. It is desirable to have a drive unit that is capable of being used interchangeably with either type of window-actuator; that is, a universal window-actuator drive unit.

A window-actuator drive unit of the type to which the improvement of the present invention relates is described in U.S. Pat. No. 5,095,766 to Knappe et al., which is incorporated herein by reference, and its counterpart European application EP-B1-0 360 912. The '766 drive unit is universal in that it may be used both with a cable pulley window-actuator and an arm-scissors type window-actuator. This flexibility is provided by a specially adapted shaft collar coupled to the driving disk of the drive unit. The shaft collar is equipped with an outer grooved toothing capable of establishing an interlocking rotational-slave relationship with a cable pulley component of a cable pulley window-actuator or with a driving pinion of an arm-scissors type window-actuator, both of which have a corresponding inner grooved toothing.

Although the window-actuator drive unit of the '766 patent works well, it would be beneficial to have a universal window-actuator drive unit that is substantially more compact without sacrificing efficiency of operation. A further requirement of such a device is that it continue to perform under the high impacts and shock stresses likely to arise from automotive use.

SUMMARY OF THE INVENTION

The present invention provides a universal window-actuator drive unit that is substantially more compact than the window-actuator drive units currently known in the art. A window-actuator drive unit according to the present invention includes a driving disk with an actuator shaft collar. The actuator shaft collar concentrically surrounds a gear housing shaft on which the driving disk is mounted, and includes an inner grooved toothing capable of establishing an interlocking rotational-slave relationship with a shaft collar of a cable pulley for a cable pulley window-actuator, or with a driving pinion of an arm-scissor type window-actuator, each of which have an outer grooved toothing. Both the outer grooved toothing of the cable pulley and the outer grooved toothing of the driving pinion correspond to the inner toothing of the actuator shaft collar.

The universal window-actuator drive unit of the present invention allows the radial diameter of a cable pulley window-actuator to be reduced from the size required for a window-actuator drive unit having a driving disk shaft collar with an outer grooved toothing. The means for coupling a cable pulley window-actuator to a window-actuator drive unit need only have a radial diameter substantially corresponding to the inner circumference of the driving disk shaft collar, as opposed to its outer circumference. Thus, the cable pulley window-actuator and window-actuator drive unit form a significantly more compact device, with equally good transmission of moment as compared to known window-actuator drive units.

DETAILED DESCRIPTION

Figure 1:
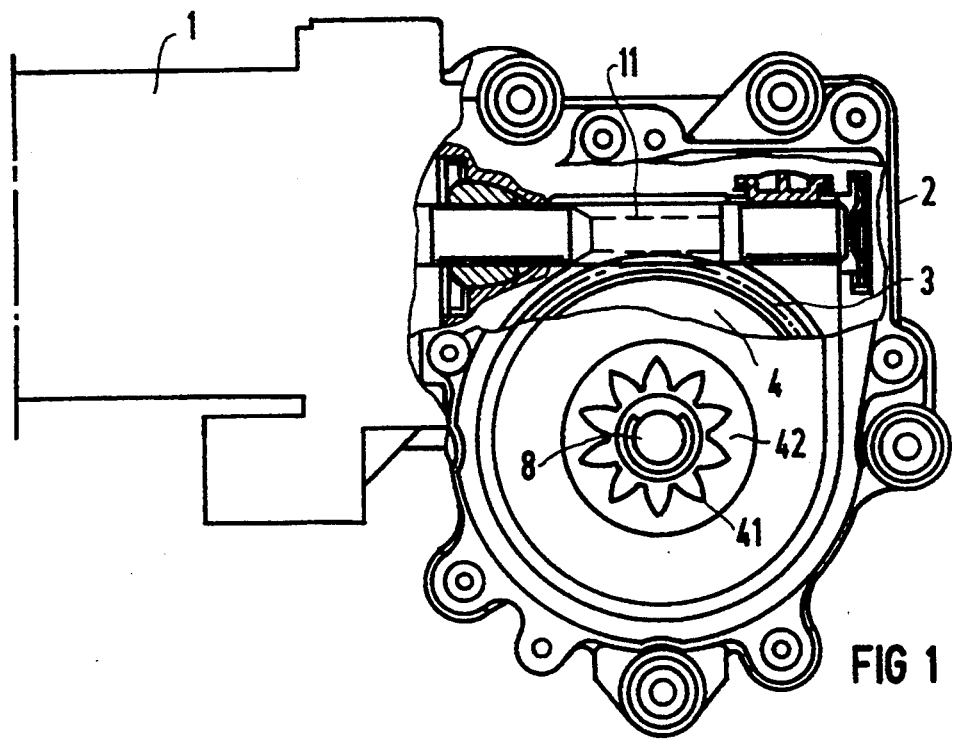
FIG. 1 is an axial view, partially in cross-section, of a universal window-actuator drive unit according to the present invention.

FIG. 1 shows an axial, longitudinal view, in partial cross-section, of the fundamental design of an electromotive drive unit which may be used to power either a cable pulley window-actuator or an arm-scissors type window-actuator. The electric driving motor 1 is indicated only schematically; its elongated rotor shaft extends as a worm shaft 11 into a cup-shaped gear housing 2, which is flanged onto the housing of the electric driving motor 1, and mates with a worm gear 3. The worm gear 3 is connected in a rotational-slave relationship to a driving disk 4, which slips into corresponding carrier pockets of the worm gear 3 by way of axially protruding cams using a damping separator as an intermediate gear.

Both the worm gear 3 and the driving disk 4 are rotatably mounted on a gear housing shaft 8. One end of the gear housing shaft 8 is secured in the gear housing 2, while the other end is adapted to receive either of the structural parts shown in FIG. 2 and FIG. 3 by means of a simple plug-in assembly technique. The driving disk 4 is fitted with an actuator shaft collar 42, which is provided over its inner circumference with a grooved toothing 41.

Figure 2:
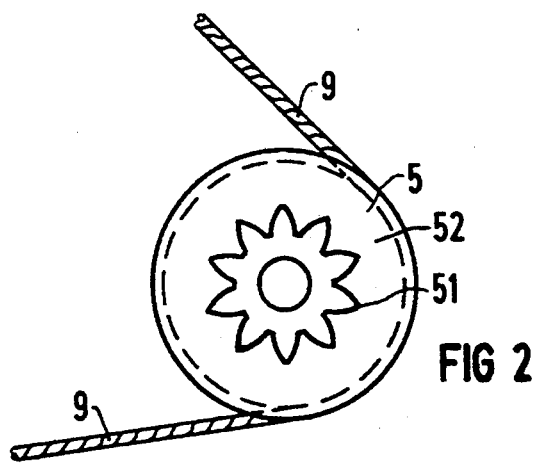
FIG. 2 is an axial view of the cable pulley component of a cable pulley window-actuator capable of use with the window-actuator drive unit of the present invention.

FIG. 2 is an axial view of a cable pulley component for a cable pulley window-actuator. The cable pulley 5 is of a type known in the art, and includes a cable groove for taking up a cable 9 having a looped rope eye. The cable pulley 5 also includes a shaft collar 52 with a grooved toothing 51 around its outer circumference. The grooved toothing 51 corresponds to the inner grooving 41 of the driving disk 4 pictured in FIG. 1, and thus enables the cable pulley 5 and drive disk 4 to achieve a rotational-slave relationship simply by plugging the shaft collar 52 into the driving disk 4.

Figure 3:
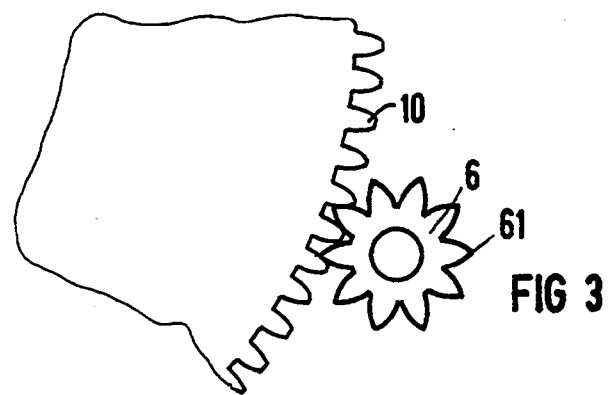
FIG. 3 is an axial view of the drive pinion of an arm-scissors type window actuator capable of use with the window-actuator drive unit of the present invention.

FIG. 3 is an axial view of a drive pinion for mating with a gear rack 10 for driving an arm-scissor type window-actuator. The drive pinion 6 is provided with a grooved toothing 61 around its outer circumference.

The grooved toothing 61 corresponds to the inner grooving 41 of the driving disk 4 pictured in FIG. 1, and thus enables the drive pinion 6 and drive disk 4 to achieve a rotational-slave relationship simply by plugging the drive pinion 6 into the driving disk 4.

Figure 4:
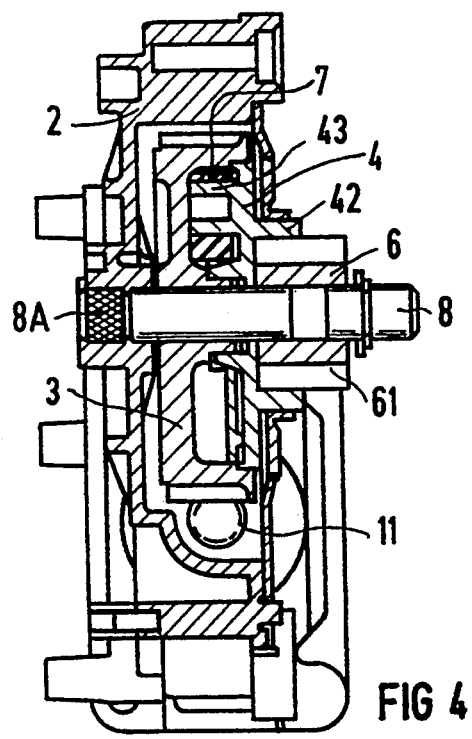
FIG. 4 is a radial cross-sectional view of a window-actuator drive unit coupled to a drive pinion for an arm-scissors type window-actuator.

FIG. 4 illustrates a universal window-actuator drive unit according to the present invention capable of serving as a drive unit for an arm-scissors type of window-actuator. The drive unit shown in cross-section in FIG. 4 corresponds to the drive unit shown in axial view in FIG. 1.

Referring to FIG. 4, a gear housing shaft 8 is secured to the housing base of the cup-shaped gear housing 2 at function 8A. A worm gear 3, driven by the worm shaft 11, is rotatably supported on the gear housing shaft 8. Carrier pockets are distributed over the circumference of the worm gear 3. Using a damping separator 7 as an intermediate gear, slaving cams 43 Of a driving disk 4 protrude axially toward the worm gear and slip into the carrier pockets. Thus, the driving disk 4 is also rotatably supported on the gear housing shaft 8. The driving disk 4 has an actuator shaft collar 42, which is provided over its inner circumference with a grooved toothing 41.

An arm-scissors type window-actuator is placed in a rotational-slave relationship with the window-actuator drive unit by mating a drive pinion 6 of the window-actuator to the driving disk 4 of the drive unit. The drive pinion 6 is provided over its outer circumference with a grooved toothing 61 that corresponds to the grooved toothing 41 on the inner circumference of the shaft collar 42. The drive pinion 6 transfers the rotational motion to a lifter mechanism of the arm-scissor type window-actuator (not shown).

Figure 5:
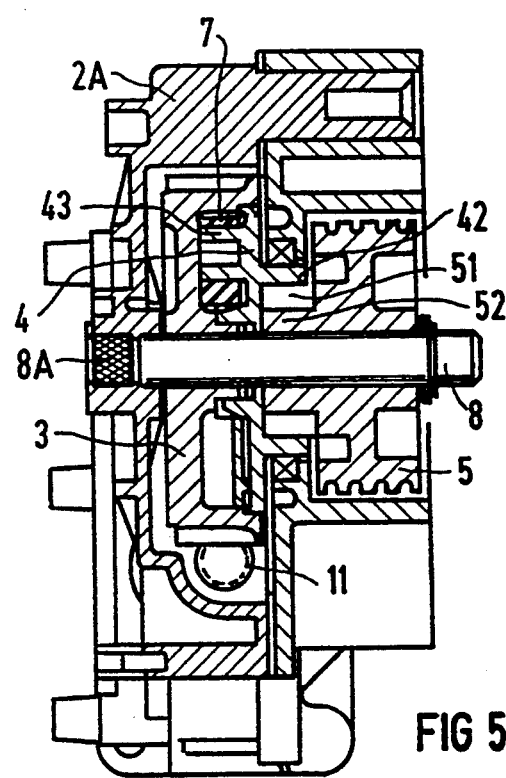
FIG. 5 is a radial cross-sectional view of a window-actuator drive unit coupled to a cable pulley for a cable pulley window-actuator.

FIG. 5 illustrates a universal window-actuator drive unit according to the present invention capable of serving as a drive unit for a cable pulley window-actuator. The drive unit shown in cross-section in FIG. 5 corresponds to the drive unit shown in axial view in FIG. 1.

Referring to FIG. 5, a gear housing shaft 8 is secured to the housing base of the cup-shaped gear housing 2 at juction 8A. Like the embodiment in FIG. 4, a worm gear 3, driven by the worm shaft 11, is rotatably supported on the gear housing shaft 8. Carrier pockets are distributed over the circumference of the worm gear 3. Using a damping separator 7 as an intermediate gear, slaving cams 43 of the driving disk 4 protrude axially toward the worm gear and slip into the carrier pockets. Thus, the driving disk 4 is also rotatably supported on the gear housing shaft 8. The driving disk 4 has an actuator shaft collar 42, which is provided over its inner circumference with a grooved toothing 41.

A cable pulley window-actuator is placed in a rotational-slave relationship with the window-actuator drive unit by mating a cable pulley 5 to the driving disk 4 of the window-actuator drive unit. The cable pulley 5 is provided with a shaft collar 52, which has over its outer circumference a grooved toothing 51 that corresponds to the grooved toothing 41 on the inner circumference of the actuator shaft collar 42.

Figure 6:
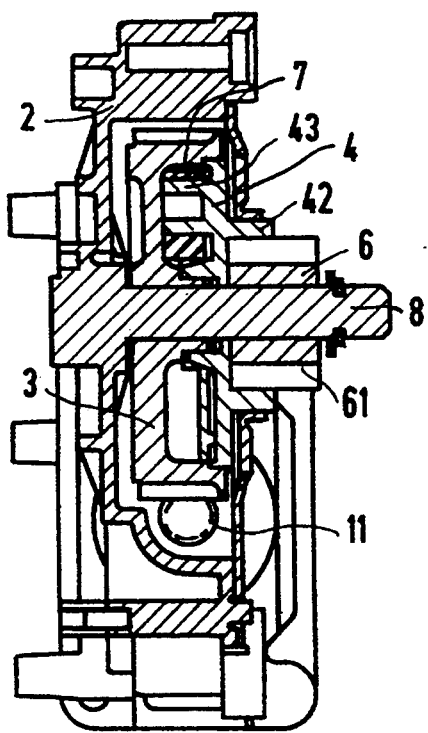
FIG. 6 is a radial cross-sectional view of a window-actuator drive unit coupled to a drive pinion for an arm or scissors-type window-actuator in which the gear housing shaft is integrally formed with the gear housing.

In both FIG. 4 and FIG. 5, the gear housing shaft 8 is depicted as a separate structural part, preferably manufactured of metal. Alternatively, the gear housing shaft 8 can be injection-molded as a shaft journal 8' comprising a portion of a single-piece plastic gear housing 2, as shown in FIG. 6. Such a single-piece construction serves to make the unit more resistant to high impacts and shock stresses common in automotive applications.

What is claimed is:

1. A window-actuator drive unit comprising a gear housing, a worm gear, a driving motor with a worm shaft driving said worm gear, a gear housing shaft rigidly connected to said gear housing on which said worm gear is rotatably supported, and a coaxial driving disk having an actuator shaft collar protruding axially from the side of said driving disk opposite said worm gear, said actuator shaft collar concentrically surrounding said gear housing shaft and having an inner grooved toothing for concentrically and attachably mating with a coupling portion of a window-actuator.

2. The window-actuator drive unit of claim 1, wherein said actuator shaft collar is rotatably coupled to a drive pinion, said drive pinion having a grooved toothing over its outer circumference, said grooved toothing of said drive pinion corresponding to said inner grooved toothing of said actuator shaft collar.

3. The window-actuator drive unit of claim 2, wherein said drive pinion is coupled to a gear rack for driving an arm-scissor type window-actuator.

4. The window-actuator drive unit of claim 1, wherein said actuator shaft collar is rotatably coupled to a cable pulley, said cable pulley having a shaft collar with a grooved toothing over its outer circumference, said grooved toothing of said shaft collar corresponding to said inner grooved toothing of said actuator shaft collar.

5. The window-actuator drive unit of claim 4, wherein said cable pulley cooperates with a cable for driving a cable pulley window-actuator.

6. The window-actuator drive unit of claim 1, wherein said driving disk and said actuator shaft collar comprise a single component formed from injection-molded plastic.

7. The window-actuator drive unit of claim 1, wherein said gear housing shaft comprises a separate component distinct from said gear housing, said gear housing shaft being fixedly coupled to said gear housing.

8. The window-actuator drive unit of claim 1, wherein said gear housing shaft is integrally formed on said gear housing.

* * * * *